United States Patent [19]

Ukai et al.

[11] Patent Number: 4,805,921
[45] Date of Patent: Feb. 21, 1989

[54] MECHANICAL SHAFT JOINT BOOT

[75] Inventors: Mikio Ukai, Nagoya; Takashi Furukawa, Ama; Yasuo Hojo, Nagoya, all of Japan

[73] Assignees: Toyoda Gosei Co., Ltd., Nishikasugai; Toyota Jidosha Kabushiki Kaisha, Toyota, both of Japan

[21] Appl. No.: 163,097

[22] Filed: Mar. 2, 1988

[30] Foreign Application Priority Data

Mar. 4, 1987 [JP] Japan ............................ 62-031243[U]

[51] Int. Cl.$^4$ ............................ F16J 3/04; F16J 15/52
[52] U.S. Cl. ................................ 277/212 FB; 74/18; 403/50
[58] Field of Search ............ 277/212 FB; 74/18, 18.1, 74/18.2; 403/50, 51

[56] References Cited

U.S. PATENT DOCUMENTS

| 3,646,778 | 3/1972 | Fisher . |
| 4,249,395 | 2/1981 | Krude et al. . |
| 4,360,209 | 11/1982 | Ukai et al. ................ 277/212 FB X |
| 4,558,869 | 12/1985 | Grove et al. ............. 277/212 FB X |
| 4,673,188 | 6/1987 | Matsuno et al. ................. 74/18.2 X |

FOREIGN PATENT DOCUMENTS

| 2414144 | 8/1979 | France . |
| 58-142455 | 9/1983 | Japan . |
| 58-178562 | 11/1983 | Japan . |
| 62-45425 | 3/1987 | Japan . |
| 62-194923 | 12/1987 | Japan . |

Primary Examiner—Robert S. Ward
Attorney, Agent, or Firm—Cushman, Darby & Cushman

[57] ABSTRACT

A mechanical shaft joint boot integrally made up of a large-diameter ring portion and a small-diameter ring portion with a bellows portion interposed therebetween, and a straight portion connecting the bellows portion with the large-diameter ring portion. The distance 11 between the large-diameter ring portion and the small-diameter ring portion is smaller than the distance 12 between a large-diameter ring mounting portion and a small-diameter ring mounting portion of the joint, and the outside diameter of a first crest of the bellows portion is not larger than the inside diameter of the straight portion. Accordingly, when a shaft of the joint inclines to cause inclination on one side of the boot, a surface pressure being imposed on the first crest is not increased correspondingly, thereby suppressing its wear and enhancing service time of the boot.

4 Claims, 3 Drawing Sheets

Prior Art
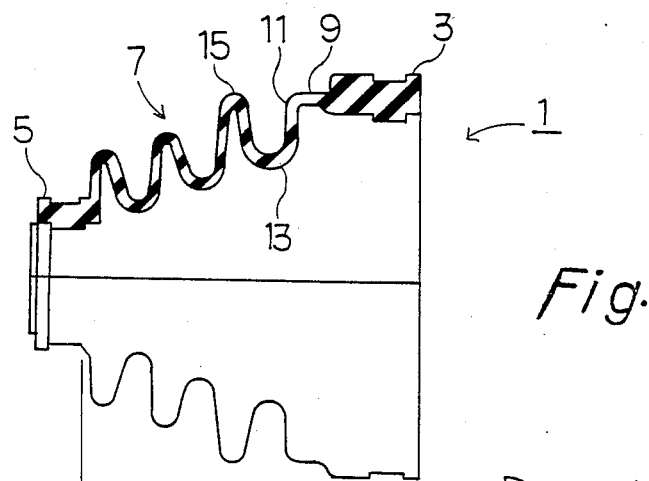
Fig. 1
Prior Art
Fig. 2
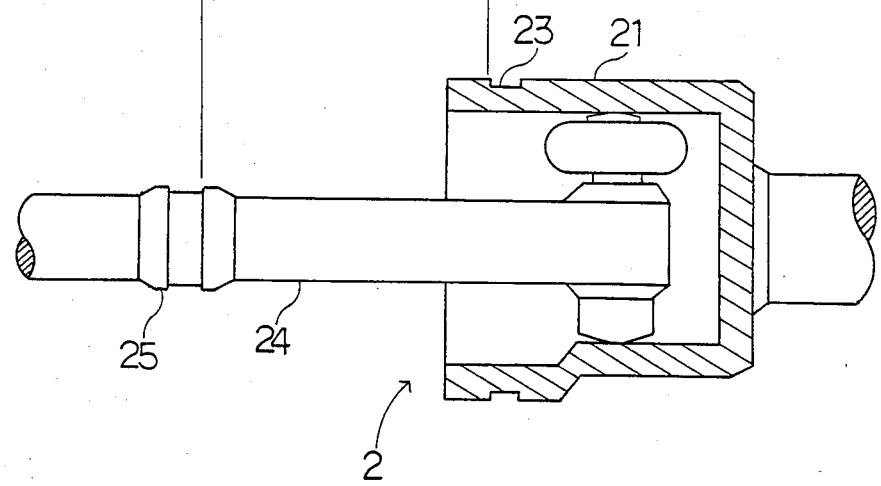

MECHANICAL SHAFT JOINT BOOT

BACKGROUND OF THE INVENTION

This invention relates to an improved mechanical shaft joint boot (hereinafter simply referred to as a "boot").

In this specification, the term "crest" indicates the top portions of individual ridge portions in a bellow portion.

In the field of boots being attached, for example, to a constant velocity joint of automobiles and the like, hitherto, a boot 1 as shown in FIG. 1 was known which is made up of a large-diameter ring portion 3, a straight portion 9, a bellows portion 7 whose first bottom portion (as numbered from the side of the large-diameter ring portion 3, this manner of numbering being also applied to crests) is connected with the straight portion 9, and a small-diameter ring portion 5 in that order. In the arrangement above, the purpose of providing the straight portion 9 between the large-diameter ring portion 3 and the bellows portion 7 is to prevent the first bottom portion 13 from being caught in a joint 2 shown in FIG. 2 and to avoid interference with other members inside a narrow engine room, i.e. to make a so-called whirlingness good (see Japanese Utility Model Applications Laid-Open Nos. 58-142455 and 58-178562).

Further, due to the presence of the straight portion 9, the distance from the center of articulation of the joint 2 to the deformable portion (the bellows portion 7) of the boot 1 becomes large. Accordingly, to make the boot 1 most adaptable to an inclination of a shaft 24, it is general practice to make the diameter of a first crest portion large, but within the limits of whirlingness.

In assembling the boot 1 to the joint 2, the large-diameter ring portion 3 is fitted on a large-diameter ring mounting portion 23 of a casing 21, the small-diameter ring portion 5 is fitted on a small-diameter ring mounting portion 25 of the shaft 24, and these portions are tightened with clamps or the like. In the foregoing arrangement, the relationship: $l1 \geq l2$ is generally held with respect to the distance l1 between the large-diameter ring portion 3 and the small-diameter ring portion 5 and to the distance l2 between the large-diameter ring mounting portion 23 and the small-diameter ring mounting portion 25. In this specification, of course, l1 represents the distance between the large-diameter ring portion 3 and the small-diameter ring portion 5 when the boot is in a free or no-load state. If a peculiar relationship: $l1 > l2$ is selected for the two distance l1 and l2, this means that the boot previously held in compression be attached to the joint 2 for purpose of promoting expansion of the film of the bellows portion 7 within the definite distance between bellows the straight portion 9 and the small-diameter ring portion 5.

As described above, however, the distance from the center of articulation of the joint 2 to the deformable portion (the bellows portion 7) of the boot 1 becomes large because of the presence of the straight portion 9. Therefore, when the shaft 24 is made inclined, the defect necessarily occurs that the boot 1 is severely compressed.

In this respect, it has become clear through the examination done by the present inventor that wear is hastened at the first crest 15 (the vicinity of its top portion) coming into contact with a shoulder portion 11 to the straight portion 9, as shown in FIG. 3, thereby deteriorating the durability (see test results hereinafter described). It has also become clear that the durability of the first crest 15 governs the overall durability of the boot 1.

SUMMARY OF THE INVENTION

A boot according to the present invention is characterized by a first limitation that the outside diameter of a first crest of a bellows portion is not larger than the inside diameter of a straight portion is not, and a second limitation that the distance l1 between a large-diameter ring portion and a small-diameter ring portion is smaller than the distance l2 between a large-diameter ring mounting portion and a small-diameter ring mounting portion such that when the boot is attached to a joint the bellows portion is made expanded.

As will be appreciated from the foregoing configuration, a first object of the present invention is to suppress wear of the first crest portion by causing, when a shaft of the joint inclines to compress one side of the boot, the first crest on the thus compressed side to interfere with a slant surface (easily deformable as compared to the straight portion) connecting the straight portion with the first crest to thereby lower a surface pressure being imposed on the first crest.

A second object of the present invention is to suppress wear of the first crest by previously putting the boot in expansion when attaching the boot to the joint such that when the shaft of the joint inclines to compress one side of the boot such force of compression is counterbalanced to thereby lower a surface pressure being imposed on the first crest.

BRIEF DESCRIPTION OF THE DRAWINGS

FIG. 1 is a sectional view, partly in greater detail, of a boot of the prior art;

FIG. 2 is a side view, partly in cross section, of a joint;

DESCRIPTION OF THE PREFERRED EMBODIMENT

Figure 3:
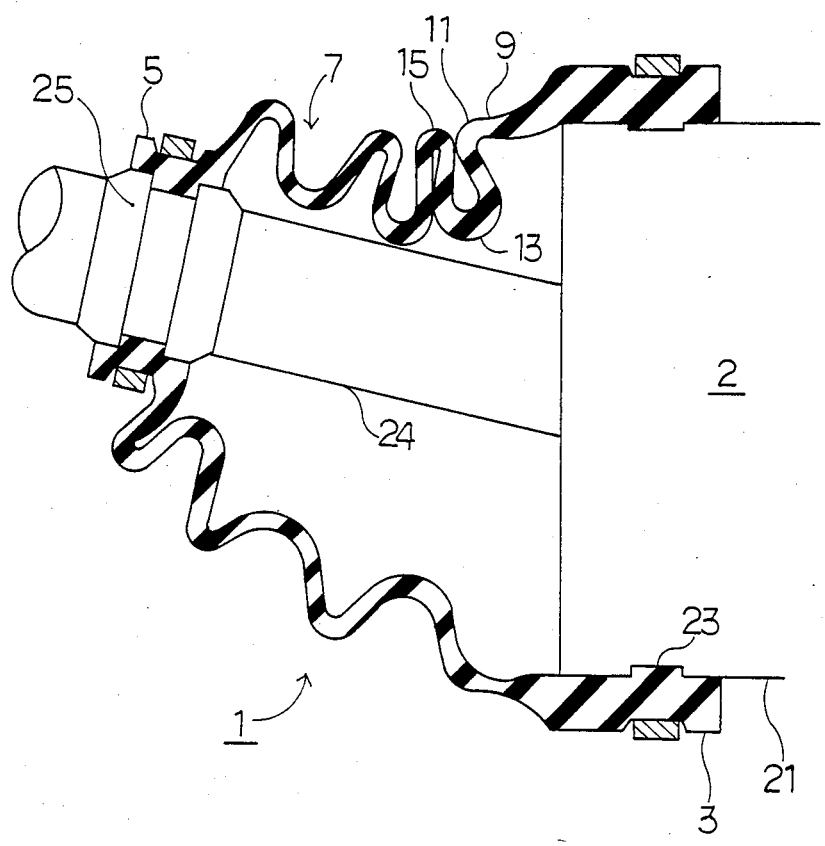
FIG. 3 is a side view (based on an X-ray photograph), partly in cross section, showing the boot of the prior art and the joint with its shaft inclined.
Figure 4:
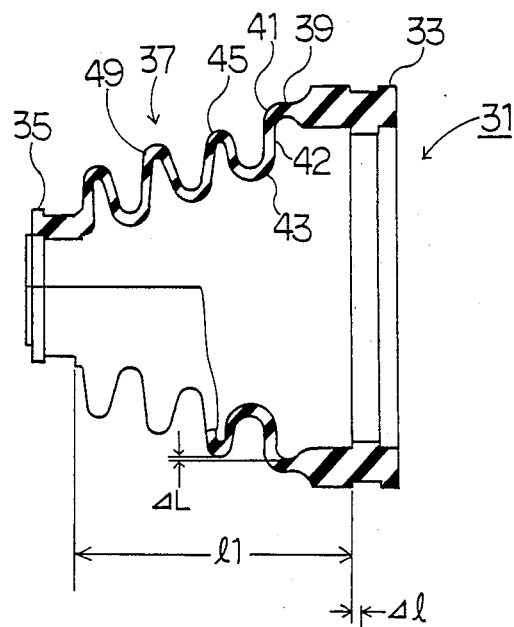
FIG. 4 is a sectional view, partly in greater detail, of a boot according to the present invention.
Figure 5:
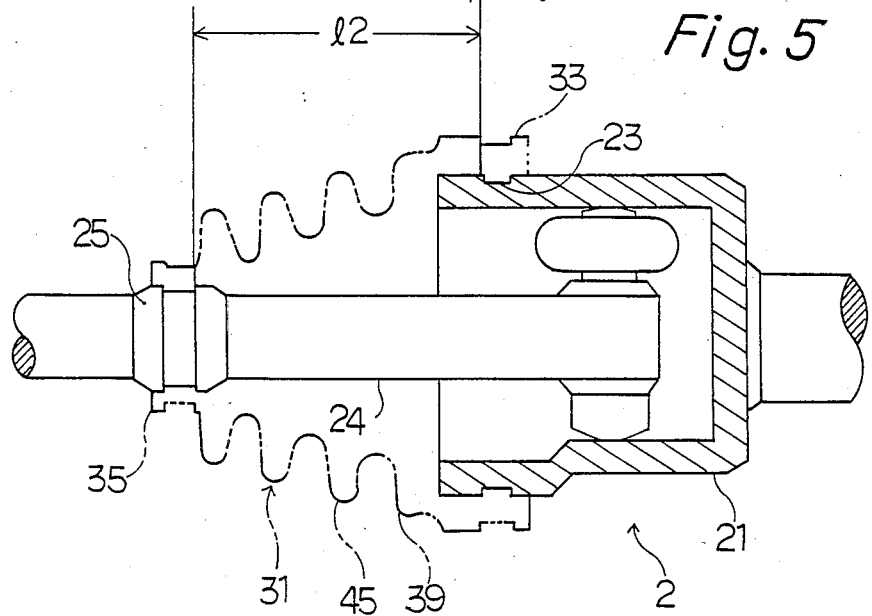
FIG. 5 is a side view, partly in cross section, of the joint.

An embodiment of the present invention will now be described in greater detail with reference to the drawings, in which the same members as those described in connection with the prior art are designated by identical reference numerals with their description partly omitted.

Like the conventional one, a boot 31 embodying the present invention is fundamentally made up of a large-diameter ring portion 33, a straight portion 39, a bellows portion 37 whose first bottom portion 43 is connected with the straight portion 39, and a small-diameter ring portion 35, in that order.

The first feature of the present invention is that the outside diameter of the first crest 45 is made not larger than the inside diameter of the straight portion 39.

Figure 6:
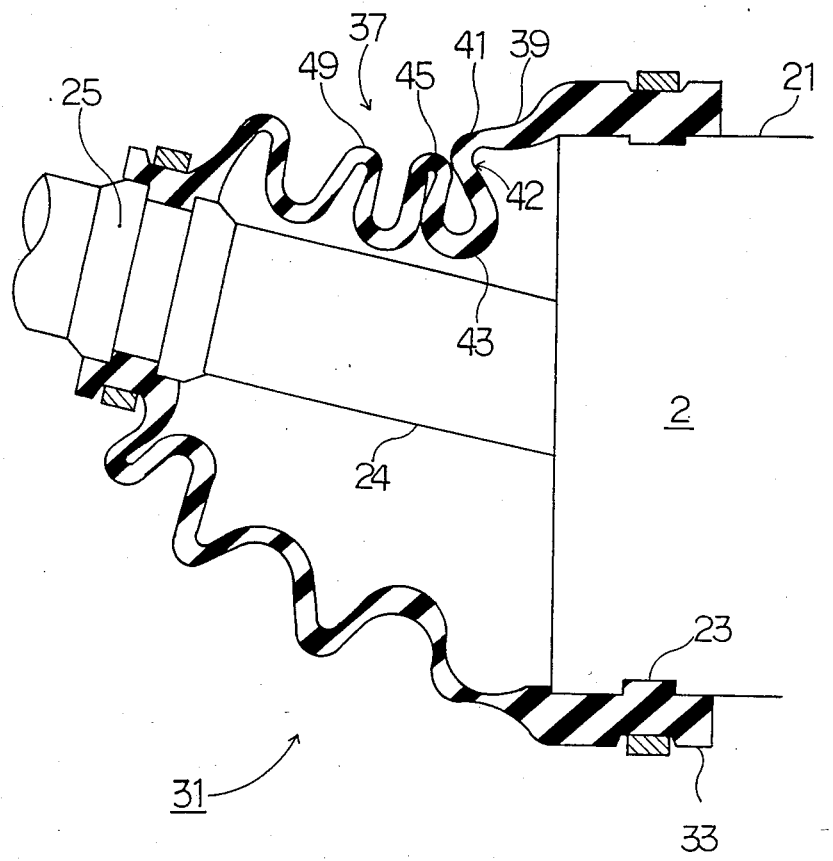
FIG. 6 is a side view (based on an X-ray photograph), partly in cross section, showing the boot according to the present invention and the joint with its shaft inclined.

As a result of the foregoing feature or limitation, when the shaft 24 is inclined as shown in FIG. 6, the first crest 45 comes into contact with a slant surface 42 connecting a shoulder portion 41 of the straight portion 39 and the first bottom portion 43, not with the shoulder portion 41. Since this slant surface portion 42 is easily deformable toward the casing 21 (in the right-hand direction in the drawing) as compared to the straight section 39, a surface pressure being imposed on the first crest 45 is reduced. Thus, the wear of the first crest 45 can be suppressed.

If the foregoing limitation is satisfied, no other limitations are needed for the outside diameter of the first crest 45. But, making its outside diameter too small is not preferred because the bellows portion 37 itself becomes hardly deformable; the reason is that the first crest 45 is nearest to the center of articulation of the joint 2, thus serving as the most deformable portion. The difference ($\Delta L \times 2$, in the drawing) between the outside diameter of the first crest 45 and the inside diameter of the straight portion 39 is preferably of the order of 0 to 10 mm.

Further, it is preferable to satisfy the condition: $0.6 < A/B < 1.1$, where A is the thickness of the straight portion 39 and B is the thickness of the slant surface portion 42 (see Japanese patent application No. 60-169352).

The second feature of the present invention is that the distance 1 between the large-diameter ring portion 33 and the small-diameter ring portion 35 is made smaller than the distance 2 between the large-diameter ring mounting portion 23 and the small-diameter ring mounting portion 25 such that when attaching the boot 31 to the joint 2 the bellows portion can expand.

As a result of the foregoing feature or limitation, when the boot 31 is attached to the joint 2, the bellows portion 37 of the boot 31 expands from the free or no-load state by $\Delta l$ (preliminary expansion) as indicated in the drawing. Accordingly, when the shaft 24 inclines to compress one side of the boot 31, due to such preliminary expansion some force of compression can be counterbalanced. Therefore, a surface pressure being imposed on the first crest 45 is reduced and the wear of the first crest 45 can be suppressed.

According to the examination done by the present inventor, it is preferable that the amount of preliminary expansion, $\Delta l$, be within a range of 2 to 10% of the length in the axial direction of the bellows portion 37. The reason is that making the amount of preliminary expansion too large results in a danger that the bellows portion 37 will become hardly deformable. Since the purpose of adopting preliminary expansion is to reduce a contact pressure between the first crest 45 and the straight portion 39, it is preferable to adequately design the thickness of the bellows portion 37 such that the segment from the first crest 45 to a second crest 49 can expand preferentially owing to the provision of preliminary expansion. It is also preferable to make the thickness of the first bottom portion 43 large such that the first crest 45 can hardly fall against the straight portion 39.

Representative forming material of the boot 31 of the foregoing configuration is synthetic rubber, such as NR, NBR, SBR, BR, or CR. The boot 31 is fabricated by injection molding.

A performance test done on the boot 31 of the embodiment will now be described. One subject example embodying the present invention and one conventional boot (as shown in FIG. 1) adopted for comparison, made of CR, were dimensioned as listed in Table 1.

TABLE 1

|  | Example | Conventional |
|---|---|---|
| Length in axial direction of bellows portion | 50 mm | 53.5 mm |
| Outside diameter of the first crest | 80 mm | 85 mm |
| Inside diameter of straight portion | 85 mm | 85 mm |
| Preliminary expansion $\Delta l$ | 3.5 mm | 0 |

An endurance test was performed with each test member assembled to a joint on the differential side of a drive shaft for automobile under the following conditions:

Ambient temperature . . . room temperature
Rotation speed . . . 350 rpm
Inclination angle of shaft . . . 12 degrees
Time . . . 200 hr
Results: the extent of wear in thickness at the first crest of the subject example was 0.2 mm, whereas the conventional one exhibited 1.0 mm (five times as deep as the subject example).

According to a further test done by the present inventor under the condition that each test member, the subject example and the conventional one, was assembled to the joint and the shaft was progressively inclined while rotating at 350 rpm, the behavior of the compression side of each test boot was as listed in Table 2.

TABLE 2

|  | Example | Conventional |
|---|---|---|
| Angle at which interference starts to appear between the first crest and the straight portion or slant surface | 12° | 10.5° |
| Angle at which the first crest starts to be pinched between the second crest and the straight portion or slant surface | 17° | 14° |

For reference, the joint on the differential gear side of drive shaft for automobile was of the type wherein the point of articulation of the shaft 24 is movable in the axial direction as shown in FIG. 2, but the foregoing test was performed while fixing it at the position where the conventional boot can be attached in the free or no-load state ($\Delta l = 0$).

What is claimed is:

1. A mechanical shaft joint boot comprising:
   (a) a large-diameter ring portion to be attached to a large-diameter ring mounting portion of a housing of the mechanical shaft joint;
   (b) a small-diameter ring portion to be attached to a small-diameter ring mounting portion of a shaft of the mechanical shaft joint;
     the distance l1 between said large-diameter ring portion and said small-diameter ring portion when said boot is in a no-load state being smaller than the distance l2 between the large-diameter ring mounting portion and the small-diameter ring mounting portion of the mechanical shaft joint;
   (c) a bellows portion provided between said large-diameter ring portion and said small-diameter ring portion; and (d) a straight portion provided between said large-diameter ring portion and said bellows portion, said straight portion being connected with a first bottom portion (as numbered from the side of said large-diameter ring portion) of said bellows portion, and the outside diameter of a first crest (as numbered from the side of said large-diameter ring portion) of said bellows portion being not larger than the inside diamber of said straight portion.

2. A mechanical shaft joint boot according to claim 1, wherein the difference between the outside diameter of said first crest and the inside diameter of said straight portion is within a range of 0 to 10 mm.

3. A mechanical shaft joint boot according to claim 1, wherein the difference $\Delta l$ between the distance $l1$ from said large-diameter ring portion to said small-diameter ring portion and the distance $l2$ from the large-diameter ring mounting portion to the small-diameter ring mounting portion is of the order of 2 to 10% of the length in the axial direction of said bellows portion.

4. A mechanical shaft joint boot according to claim 2, wherein the difference $\Delta l$ between the distance $l1$ from said large-diameter ring portion to said small-diameter ring portion and the distance $l2$ from the large-diameter ring mounting portion to the small-diameter ring mounting portion is of the order of 2 to 10% of the length in the axial direction of said bellows portion.

* * * * *